(No Model.)
J. W. HAMMETT.
AGRICULTURAL IMPLEMENT.
No. 460,012. Patented Sept. 22, 1891.
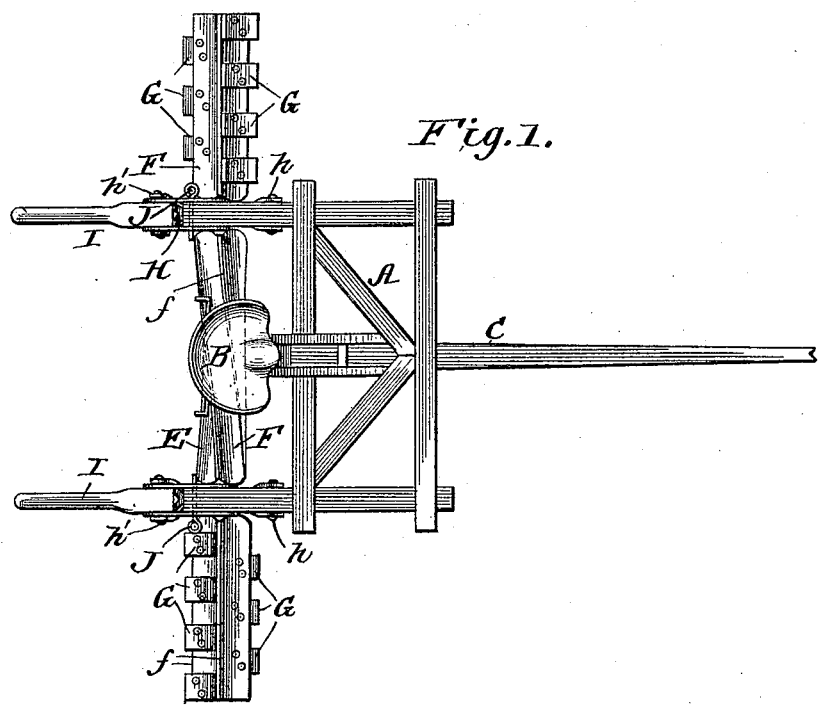
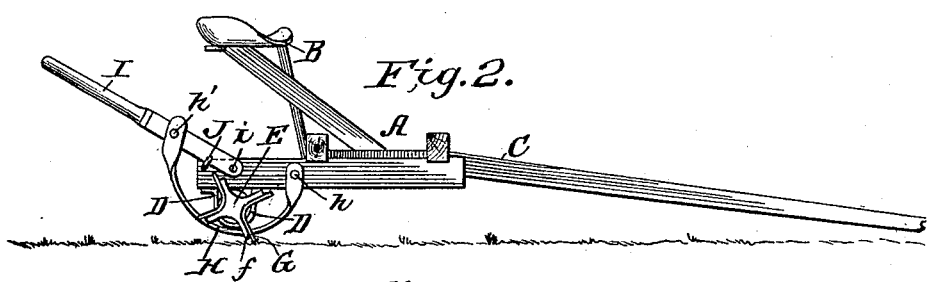
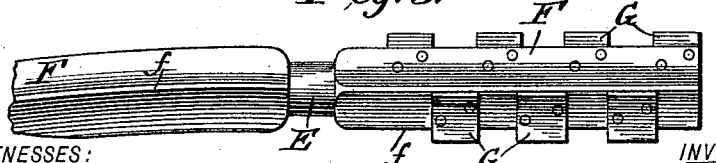

UNITED STATES PATENT OFFICE.

JAMES W. HAMMETT, OF EUREKA, WEST VIRGINIA.

AGRICULTURAL IMPLEMENT.

SPECIFICATION forming part of Letters Patent No. 460,012, dated September 22, 1891.

Application filed December 17, 1890. Serial No. 375,040. (No model.)

*To all whom it may concern:*

Be it known that I, JAMES W. HAMMETT, of Eureka, in the county of Pleasants and State of West Virginia, have invented a new and useful Improvement in Agricultural Implements, of which the following is a specification.

My invention is an improved implement designed for use in mashing down weeds, bushes, briers, &c., for rendering the ground firm before planting, and also for use in setting broadcast seed into the ground.

The invention consists in certain novel constructions and combinations of parts, as will be hereinafter described, and pointed out in the claims.

In the drawings, Figure 1 is a top plan view, and Fig. 2 a side view, of my improved implement, and Fig. 3 illustrates the shaft.

The main frame A has the driver's seat B and pole C, and is provided at or near its rear end with bearings D for the shaft E. This shaft E is fluted longitudinally, and is preferably twisted slightly, as shown, the flutes F serving to produce edges at $f$, as shown. This shaft F is preferably made of Bessemer steel, and for two horses I find it desirable to make the shaft fourteen (14) feet long and four (4) inches square, drawing the square from edge $f$ straight to edge $f$. This shaft F extends for some distance outside of frame A, and has such extended portions provided with knife or cutter blades G, which are bolted or riveted to the shaft and project about three (3) inches beyond the edges $f$. These blades G are arranged in pairs, and staggered so that each blade will operate in a line between the adjacent blades, so that the blades will cover the entire ground outside the frame. In operation these blades, by contact with the ground, cause the shaft to revolve as the machine is drawn over the ground. At proper points the shaft E is rounded to fit and turn in the bearings D. To lift the shaft so the team may turn without one end of the shaft dragging over obstructions and to raise it so it can be easily cleared of trash, I provide the shoes H and levers I. The shoes H are connected at their front ends, at $h$, to the frame A, in advance of the shaft E, and curve down, extend under, and curve up in rear of such shaft, and connect at their rear ends, at $h'$, with the levers I, which levers are pivoted at $i$ to the frame A. The shoes H are preferably made of plates of metal, having a slight spring so they will have a tendency to rest clear of the ground and hold the hand-levers elevated, and yet may be forced down by such levers when it is desired to lift the shaft clear of the ground to avoid obstructions, and also in moving the machine from point to point. By extending the shaft laterally beyond the frame A it gives the team room to work on the cleared ground and at the same time takes off all side draft. When drawn over the ground, the machine will cut and mash down weeds, bushes, briers, &c., and can also be used for rendering the ground firm for planting.

After seed has been sown broadcast, the machine in working down the inequalities of the ground and destroying the brush, briers, weeds, &c., will serve to plant the seed.

Pins or bolts J are employed for holding the levers in or up clear of the ground. These pins fit in openings or sockets in the side beams of frame A, and are arranged in proper position to fit above or below the levers to hold the same up or down, as will be understood from Fig. 2.

Having thus described my invention, what I claim as new is—

1. In an implement substantially as described, a shaft fluted and twisted and provided with blades, substantially as set forth.

2. In an implement substantially as described, a shaft fluted and twisted, having circular portions to journal in the supporting-frame and provided with blades arranged alternately, substantially as described and shown.

3. An improved implement, substantially as described, comprising the frame, and the shaft fluted longitudinally and twisted spirally, such shaft being journaled to the frame, all substantially as set forth.

4. In an implement substantially as described, a shaft fluted longitudinally and provided with blades arranged alternately and adapted to operate substantially as and for the purposes set forth.

5. In an implement substantially as described, the combination of the framing, the fluted shaft journaled to said framing and provided with grooves, and the shoes and their operating devices, such shoes being arranged to fit in the grooves of the shaft when the latter is lowered, substantially as shown and described.

6. In an implement substantially as described, the improved shaft fluted longitudinally, forming the edges $f$, and provided with blades secured in the grooves of the shaft and projecting at their ends beyond the edges $f$, the blades in the opposite flutes being arranged alternately, substantially as and for the purposes set forth.

JAS. W. HAMMETT.

Witnesses:
S. C. HAMMETT,
J. S. GOEBEL.